(12) United States Patent
Hallenstål

(10) Patent No.: US 11,297,113 B2
(45) Date of Patent: Apr. 5, 2022

(54) METHODS AND APPARATUS FOR REGISTERING AN IMS SUBSCRIBER USING TEMPORARY IDENTIFIERS

(71) Applicant: Telefonaktiebolaget LM Ericsson (publ), Stockholm (SE)

(72) Inventor: Magnus Hallenstål, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/769,838

(22) PCT Filed: Dec. 21, 2017

(86) PCT No.: PCT/EP2017/084235
§ 371 (c)(1),
(2) Date: Jun. 4, 2020

(87) PCT Pub. No.: WO2019/120554
PCT Pub. Date: Jun. 27, 2019

(65) Prior Publication Data
US 2021/0185098 A1    Jun. 17, 2021

(51) Int. Cl.
*H04L 29/06* (2006.01)
*H04L 65/1073* (2022.01)
(Continued)

(52) U.S. Cl.
CPC ...... *H04L 65/1073* (2013.01); *H04L 63/0407* (2013.01); *H04L 65/1006* (2013.01);
(Continued)

(58) Field of Classification Search
CPC ..... H04W 12/02; H04W 12/72; H04W 12/75; H04W 8/04; H04W 8/18; H04W 84/042;
(Continued)

(56) References Cited

U.S. PATENT DOCUMENTS

2012/0131167 A1* 5/2012 Shen ................... H04L 65/1046
709/223
2017/0318452 A1  11/2017 Hahn et al.
(Continued)

OTHER PUBLICATIONS

3GPP TSG-CT WG1 Meeting #107; 01-174877; Reno (USA), Nov. 27-Dec. 1, 2017, pp. 1-212.
(Continued)

*Primary Examiner* — Wayne H Cai
(74) *Attorney, Agent, or Firm* — Murphy, Bilak & Homiller, PLLC

(57) ABSTRACT

A method of registering a subscriber in an IP Multimedia Subsystem (IMS), said subscriber being associated with an IMS Private User Identity (IMPI) and an IMS Public User Identity (IMPU) and further being associated with a 4G or 5G conforming User Equipment (UE). The method comprises: at the UE, generating a Temporary IMS Private User Identity (TIMPI) and a Temporary IMS Public User Identity (TIMPU) from a Globally Unique Temporary Identifier (GUTI) allocated by and received from a 4G or G network
(Continued)

to temporarily identify the UE; sending an IMS registration request containing the TIMPI and the TIMPU from the UE to the IMS; at the IMS, using the TIMPI and the TIMPU to determine the GUTI, and communicating with the 4G or 5G network to determine, using the GUTI, an International Mobile Subscriber Identifier (IMSI) associated with the UE; at the IMS, using the IMSI to determine said IMPI and IMPU; and completing IMS registration of the subscriber using the IMPI and the IMPU.

18 Claims, 7 Drawing Sheets

(51) Int. Cl.
| | |
|---|---|
| *H04W 12/72* | (2021.01) |
| *H04W 12/75* | (2021.01) |
| *H04L 65/10* | (2022.01) |
| *H04L 65/1016* | (2022.01) |
| *H04W 8/04* | (2009.01) |
| *H04W 8/18* | (2009.01) |
| *H04W 12/02* | (2009.01) |
| *H04W 84/04* | (2009.01) |

(52) U.S. Cl.
CPC .......... *H04L 65/1016* (2013.01); *H04W 8/04* (2013.01); *H04W 8/18* (2013.01); *H04W 12/02* (2013.01); *H04W 12/72* (2021.01); *H04W 12/75* (2021.01); *H04W 84/042* (2013.01)

(58) Field of Classification Search
CPC ............. H04L 63/0407; H04L 65/1006; H04L 65/1016; H04L 65/1073
See application file for complete search history.

(56) References Cited

U.S. PATENT DOCUMENTS

| | | | |
|---|---|---|---|
| 2019/0044980 A1* | 2/2019 | Russell | ................. H04W 12/06 |
| 2020/0084675 A1* | 3/2020 | Lu | ......................... H04W 48/16 |

OTHER PUBLICATIONS

"3GPP TS 23.501 V1.4.0", 3rd Generation Partnership Project; Technical Specification Group Services and System Aspects; System Architecture for the 5G System; Stage 2 (Release 15), Sep. 2017, pp. 1-151.

"3GPP TS 24.229 V15.0.0", 3rd Generation Partnership Project; Technical Specification Group Core Network and Terminals; IP multimedia call control protocol based on Session Initiation Protocol (SIP) and Session Description Protocol (SDP); Stage 3 (Release 15), Sep. 2017, pp. 1-987.

"3GPP TS 33.203 V15.0.0", 3rd Generation Partnership Project; Technical Specification Group Services and System Aspects; 3G security; Access security for IP-based services (Release 15), Sep. 2017, pp. 1-145.

"Adaptation to TS 23.228 due to 5GS", SA WG2 Meeting #122; S2-175068; San Jose Del Cabo, Mexico; (revision of S2-174723), Jun. 26-30, 2017, pp. 1-66.

"ETSI TS 123 003 V14", Digital cellular telecommunications system (Phase 2+) (GSM); Universal Mobile Telecommunications System (UMTS); Numbering, addressing and identification (3GPP TS 23.003 version 14.5.0 Release 14), Oct. 2017, pp. 1-84.

"3GPP TS 23.401 V15.1.0"; 3rd Generation Partnership Project; Technical Specification Group Services and System Aspects; General Packet Radio Service (GPRS) enhancements for Evolved Universal Terrestrial Radio Access Network (E-UTRAN) access (Release 15), Sep. 2017, pp. 1-397.

Arkko, J., et al., "Security Mechanism Agreement for the Session Initiation Protocol (SIP)", Network Working Group Request for Comments: 3329; Category: Standards Track, Jan. 2003, pp. 1-24.

* cited by examiner

| | |
|---|---|
| S1 | Receive a request for an International Mobile Subscriber Identifier (IMSI) from a Home Subscriber Server (HSS), wherein the request contains a Globally Unique Temporary Identifier (GUTI) allocated by a 4G or 5G network to temporarily identify a UE. |
| S2 | Identify the IMSI associated with the GUTI. |
| S3 | Send the IMSI to the HSS. |

METHODS AND APPARATUS FOR REGISTERING AN IMS SUBSCRIBER USING TEMPORARY IDENTIFIERS

TECHNICAL FIELD

The invention relates to methods and apparatus for registering a subscriber in an IP Multimedia Subsystem (IMS).

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

The next generation of telecommunication standards to be rolled out is the fifth generation (5G). 5th generation mobile networks aim to provide a higher capacity than current 4G, thereby allowing a higher "density" of mobile broadband users. 5G research and development also aims at lower latency than 4G equipment and reduced battery power consumption (specifically for better implementation of the Internet of Things). In 5G systems (5GS) it is a requirement to not send a Subscriber Permanent Identifier (SUPI), such as an International Mobile Subscriber Identifier (IMSI), in the clear (i.e. unencrypted) over a radio access network. However, current procedures for registering a User Equipment (UE) in an IMS do not protect the IMSI (or equivalently the IMS Private User Identity (IMPI) derived from the IMSI). Currently, the only existing solution is to have encryption over the radio access network on the user plane, which may not be enabled in all networks.

SUMMARY

According to a first embodiment, there is provided a method of registering a subscriber in an IP Multimedia Subsystem (IMS), said subscriber being associated with an IMS Private User Identity (IMPI) and an IMS Public User Identity (IMPU) and further being associated with a 4G or 5G conforming User Equipment (UE). The method comprises: at the UE, generating a Temporary IMS Private User Identity (TIMPI) and a Temporary IMS Public User Identity (TIMPU) from a Globally Unique Temporary Identifier (GUTI) allocated by and received from a 4G or 5G network to temporarily identify the UE; sending an IMS registration request containing the TIMPI and the TIMPU from the UE to the IMS; at the IMS, using the TIMPI and the TIMPU to determine the GUTI, and communicating with the 4G or 5G network to determine, using the GUTI, an International Mobile Subscriber Identifier (IMSI) associated with the UE; at the IMS, using the IMSI to determine said IMPI and IMPU; and completing IMS registration of the subscriber using the IMPI and the IMPU.

The IMS registration request may be a Session Initiation Protocol (SIP) REGISTER message, and the TIMPI may be included as an IMPI in the SIP message, and the TIMPU included as an IMPU in the SIP message.

The step of communicating with the 4G or 5G network to determine the IMSI may also comprise: at an Interrogating Call State Control Function (I-CSCF) of the IMS, extracting the GUTI from the TIMPI and TIMPU; sending a translation request containing the GUTI from the I-CSCF to a Home Subscriber Server (HSS); at the HSS, identifying a network node in the 4G or 5G network that is handling the GUTI, and sending a translation request to that network node; at the HSS, receiving the IMSI from the network node; and sending the IMSI from the HSS to the I-CSCF.

The GUTI may be received from a node in an Evolved Packet System (EPS). Alternatively, the GUTI can be received from a node in a 5G system, in which case the GUTI is a 5G-GUTI.

According to a second embodiment there is provided a method of registering a subscriber in an IP Multimedia Subsystem (IMS) performed at a 4G or 5G conforming User Equipment (UE). The method comprises: receiving a Globally Unique Temporary Identifier (GUTI) allocated by a 4G or 5G network to temporarily identify the UE; generating a Temporary IMS Private User Identity (TIMPI) and a Temporary IMS Public User Identity (TIMPU) from the GUTI; sending an IMS registration request containing the TIMPI and the TIMPU to the IMS; and receiving a registration response from the IMS.

The IMS registration request may be a Session Initiation Protocol (SIP) REGISTER message, and the TIMPI is included as an IMS Private User Identity (IMPI) in the SIP message, and the TIMPU is included as an IMS Public User Identity (IMPU) in the SIP message.

The GUTI may be received from a node in an Evolved Packet System (EPS). Alternatively, the GUTI can be received from a node in a 5G system, in which case the GUTI is a 5G-GUTI.

According to a third embodiment there is provided an apparatus for registering a subscriber in an IP Multimedia Subsystem (IMS). The apparatus comprises: a receiver configured to receive from a 4G or 5G network a Globally Unique Temporary Identifier (GUTI) allocated by the 4G or 5G network to temporarily identify the apparatus; a processor configured to generate a Temporary IMS Private User Identity (TIMPI) and a Temporary IMS Public User Identity (TIMPU) from the GUTI; and a transmitter configured to send an IMS registration request containing the TIMPI and TIMPU to the IMS; wherein the receiver is further configured to receive a registration response from the IMS.

The IMS registration request may be a Session Initiation Protocol (SIP) REGISTER message, and the TIMPI is included as an IMS Private User Identity (IMPI) in the SIP message, and the TIMPU is included as an IMS Public User Identity (IMPU) in the SIP message.

The receiver may be configured to receive the GUTI from a node in an Evolved Packet System (EPS). Alternatively or in addition, the receiver can be configured to receive the GUTI from a node in a 5G system, in which case said GUTI is a 5G-GUTI.

The apparatus may contain a Subscriber Identity Module (SIM) card.

According to a fourth embodiment there is provided a method of operating an Interrogating Call Session Control Function (I-CSCF) of an IP Multimedia Subsystem (IMS) to determine an IMS Private User Identity (IMPI) and an IMS Public User Identity (IMPU) associated with a subscriber during registration of said subscriber in the IMS, said subscriber being associated with a 4G or 5G conforming User Equipment (UE). The method comprises: receiving an IMS registration request containing a Temporary IMS Private User Identity (TIMPI) and a Temporary IMS Public User Identity (TIMPU); extracting from the TIMPI and the TIMPU a Globally Unique Temporary Identifier (GUTI) allocated by a 4G or 5G network to temporarily identify the UE; sending a translation request containing the GUTI to a Home Subscriber Server (HSS); receiving from the HSS an International Mobile Subscriber Identifier (IMSI) associated with the UE; and using the IMSI to determine said IMPI and IMPU.

The IMS registration request may be a Session Initiation Protocol (SIP) REGISTER message, and the TIMPI is included as an IMPI in the SIP message, and the TIMPU is included as an IMPU in the SIP message.

According to a fifth embodiment there is provided a method of operating a Home Subscriber Server (HSS) to determine an International Mobile Subscriber Identity (IMSI) associated with a 4G or 5G conforming User Equipment (UE) associated with a subscriber during registration of said subscriber in an IP Multimedia Subsystem (IMS). The method comprises: receiving a translation request containing a Globally Unique Temporary Identifier (GUTI) allocated by a 4G or 5G network to temporarily identify the UE; identifying a node in the 4G or 5G network that is handling said GUTI; sending a request for the IMSI to the network node, wherein the request contains the GUTI; and receiving the IMSI from the network node.

The network node may be a Mobility Management Entity (MME) in an Evolved Packet System (EPS). Alternatively, the network node can be an Access and Mobility Function (AMF) in a 5G system, in which case the GUTI is a 5G-GUTI.

The method may comprise sending the IMSI to an Interrogating Call State Control Function (I-CSCF) of the IMS.

According to a sixth embodiment there is provided a method of operating a network node to provide an International Mobile Subscriber Identity (IMSI) associated with a 4G or 5G conforming User Equipment (UE) associated with a subscriber, during registration of said subscriber in an IP Multimedia Subsystem (IMS). The method comprises: receiving a request for the IMSI from a Home Subscriber Server (HSS), wherein the request contains a Globally Unique Temporary Identifier (GUTI) allocated by a 4G or 5G network to temporarily identify the UE; identifying the IMSI associated with the GUTI; and sending the IMSI to the HSS.

The network node may be a Mobility Management Entity (MME) in an Evolved Packet System (EPS). Alternatively, said network node can be an Access and Mobility Function (AMF) in a 5G system, in which case said GUTI is a 5G-GUTI.

DETAILED DESCRIPTION

Figure 1:
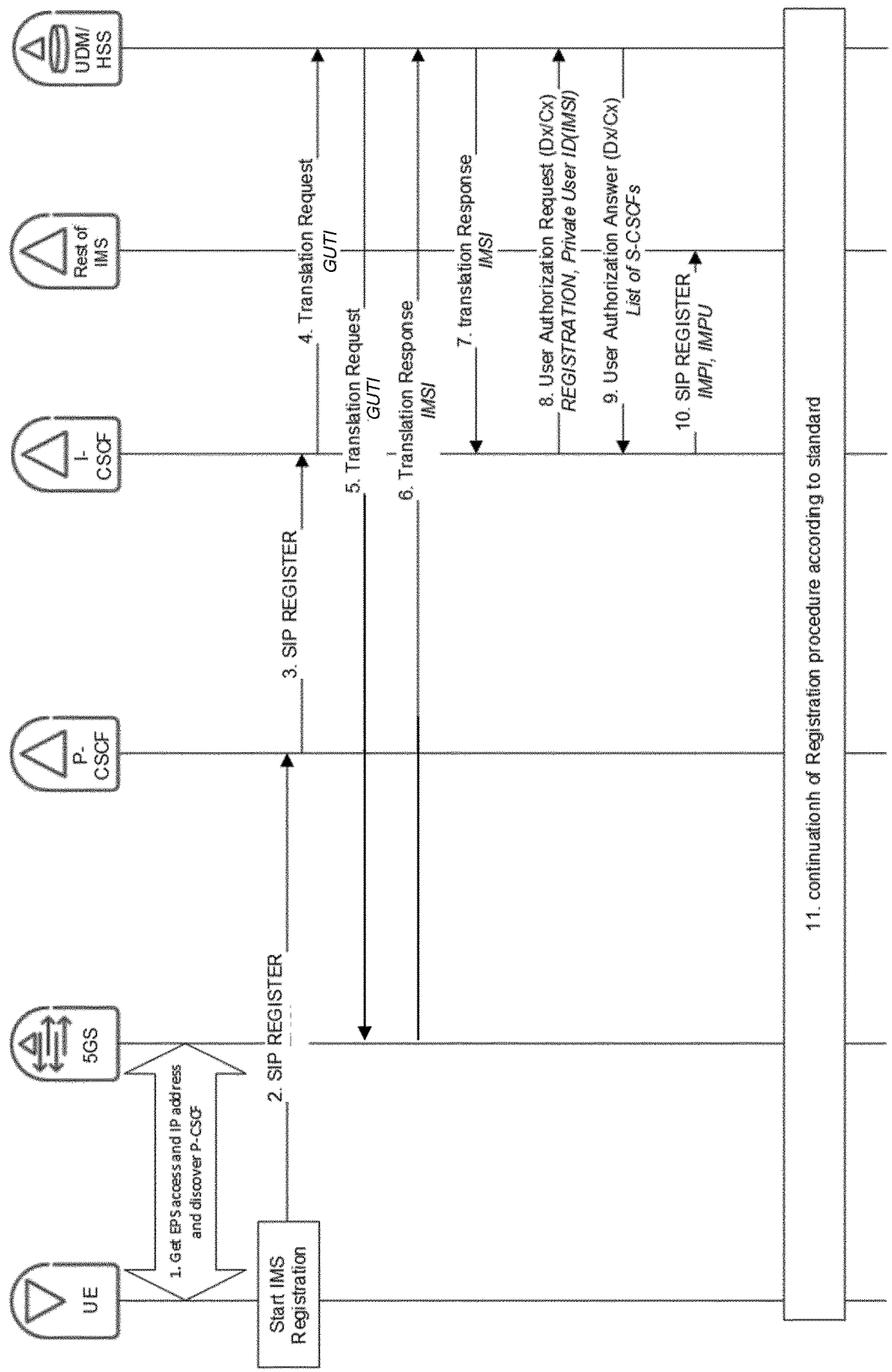
FIG. 1 is a flow diagram illustrating the steps of a method according to an embodiment.

In order for a subscriber to access services provided by the IMS he or she must register to the IMS. The registration procedure requires the subscriber to send some identifying information from a User Equipment (UE) to the IMS. To initiate registration, a UE sends a SIP registration request to the IMS network, the request including an IMS Private User Identity (IMPI) and one or more IMS Public User Identities (IMPUs), which are stored in an IP Multimedia Subscriber Identity Module (ISIM) in the UE. Alternatively, if the UE does not have an ISIM, an IMPI may be created based on a Universal Subscriber Identity Module (USIM) in the UE. The UE creates the IMPI from an International Mobile Subscriber Identifier (IMSI), which identifies the subscriber globally and uniquely.

In 5GS it is a requirement to not send identifying information such as an IMSI in the clear over a radio access network. Since the IMPI has the same level of identification of a user as the IMSI, it should also not be sent in the clear across a radio access network. Hence, embodiments described herein provide methods for registering a subscriber to the IMS without sending the IMPI from the UE to the IMS. Embodiments may also be used in current (e.g. 4G, 3G and 2G) networks in order to protect a user's identifying information.

Embodiments provide a method of determining the IMSI associated with the UE, without having to send the IMSI or IMPI in clear over the radio access network and without having to use encryption in the user plane. The method comprises using a Globally Unique Temporary Identifier (GUTI) to generate temporary identities (i.e. a Temporary IMS Private User Identity (TIMPI) and a Temporary IMS Public User Identity (TIMPU)), that are used by a UE to initiate the registration procedure. The temporary identities are used by the IMS to request and obtain the IMSI associated with the GUTI. The IMS can then determine the IMPI and IMPU of the UE from the IMSI (as normal). The registration procedure can then be completed using the IMPI and IMPU according to current procedures using IMSI to construct an IMPI and a (temporary) IMPU (i.e. an IMPU based on the IMSI). According to normal IMS functionality, multiple IMPUs may be associated with a single IMPI. An IMPU based on an IMSI may be referred to as a "temporary" IMPU in the literature, and should not be confused with the TIMPU based on a GUTI as described herein.

In the case of a 5G network, the UE uses the 5G-GUTI received as part of the registration to the 5GS to construct a TIMPI and TIMPU. The UE uses the TIMPI and TIMPU in the first SIP registration message sent to the IMS. Once received at the IMS, the IMS interrogates the combined Unified Data Management (UDM) Home Subscriber Server (HSS) to get a translation of the GUTI to IMSI. The UDM/HSS interrogates the relevant 5GS node, which is an Access and Mobility Function (AMF) handling the 5G-GUTI, to get a 5G-GUTI to IMSI translation. The UDM/HSS receives the IMSI from the 5GS node and forwards it to the IMS. The IMS then proceeds as per normal procedures with the IMS registration, using the received IMSI. Importantly, in the first part of the registration, when the UE to IMS signaling is not protected, the IMPI and IMPU are not sent.

In the case of a 4G network, the UE uses the GUTI received from an Evolved Packet System (EPS) to construct a TIMPI and a TIMPU. The UE uses the TIMPI and TIMPU in the first SIP registration message sent to the IMS. Once received at the IMS, the IMS interrogates the Home Subscriber Server (HSS) to get a translation of the GUTI to IMSI. The HSS interrogates the relevant EPS node, which is a Mobility Management Entity (MME) handling the GUTI, to get a GUTI to IMSI translation. The HSS receives the IMSI from the EPS node and forwards it to the IMS. The IMS then proceeds as per normal procedures with the IMS registration, using the received IMSI. Again, the IMPUI and IMPU are not sent in the first part of the registration when the UE to IMS signaling is not protected.

The proposed solution ensures that the IMPI, IMPU and IMSI are not sent in the clear, as long as the IMS secure association has confidentiality.

In the following text and figures, the term "HSS" is used as meaning a combined UDM/HSS in the case of a 5G network or as a HSS in the case of a 4G network.

FIG. 1 is a flow diagram illustrating the steps of an embodiment of the invention.

1. The UE accesses the 5GS system (or EPS) and acquires a 5G-GUTI (or GUTI if EPS), an IP address and a Proxy Call Session Control Function (P-CSCF) address according to known procedures.

2. The UE uses the 5G-GUTI (or GUTI) received as part of the registration to a 3GPP radio access or to 5GS to construct a TIMPI and a TIMPU in a similar way to which the IMPI and the IMPU are constructed from the IMSI (see 3GPP TS 23.003 clause 13). For example:

TIMPI=<5G-GUTI>5g-guti@ims.mnc<MNC>.mcc<MCC>0.3gppnetwork.org
TIMPU=<5G-GUTI>5g-guti@ims.mnc<MNC>.mcc<MCC>0.3gppnetwork.org The UE may use these parameters as the IMPI and the IMPU in the first SIP registration message sent to P-CSCF in the IMS (initial registration).

3. P-CSCF forwards the request to an Interrogating Call Session Control Function (I-CSCF).

4. The I-CSCF extracts the 5G-GUTI (or GUTI) from the TIMPI and TIMPU, and sends a translation request to HSS.

5. The HSS uses the 5G-GUTI to identify which AMF (or MME if EPS GUTI) in the 5GS handles the 5G-GUTI and sends the translation request to that AMF (or MME if EPS).

6. The AMF knows the 5G-GUTI to IMSI mapping and does the translation and sends a response with the IMSI.

7. The HSS forwards the received IMSI to the I-CSCF.

8. The I-CSCF constructs the IMPI and temporary IMPU in accordance with 3GPP TS 23.003 and continues the registration by means of normal IMS registration procedures.

9-11 Normal IMS registration procedure.

If the UE has several IMPUs the UE may register those once the secure association is set up and the initial registration is completed.

Figures 2, 3:
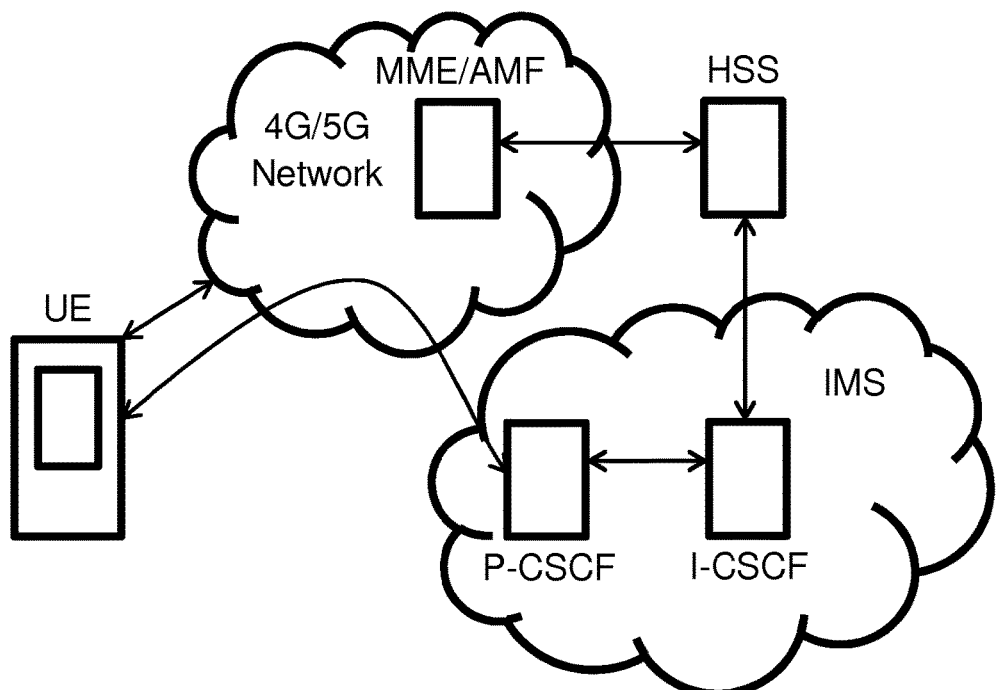
FIG. 2 is a schematic diagram of a system in which the method may be implemented.
FIG. 3 is a flow chart illustrating the steps of a method of operating a network node according to an embodiment.

FIG. 2 shows a schematic diagram of a system with a UE registered with 4G or 5G network. As part of the registration the UE receives a GUTI generated by the MME (4G) or AMF (5G) of the network. The UE uses the GUTI to generate a TIMPI and a TIMPU which are sent in registration request to the P-CSCF of the IMS. The P-CSCF forwards the registration request with the TIMPI and TIMPU to the I-CSCF of the IMS. The I-CSCF extracts the GUTI from the TIMPI and TIMPU and sends a translation request with the GUTI to the HSS. The HSS identifies the MME/AMF node handling the GUTI and sends a translation request to that node. The MME/AMF maps the GUTI to the IMSI associated with the UE and sends the IMSI to the HSS, which forwards it to the I-CSCF. The I-CSCF uses the IMSI to determine the IMPI and IMPU, which can be used to complete the registration of the subscriber.

FIG. 3 is a flow chart illustrating the steps of a method of operating a network node according to an embodiment of the invention. The method comprises receiving a request for an International Mobile Subscriber Identifier (IMSI) from a Unified Data management (UDM)/Home Subscriber Server (HSS), wherein the request contains a Globally Unique Temporary Identifier (GUTI) allocated by a 4G or 5G network to temporarily identify a UE S1; Identifying the IMSI associated with the GUTI S2; and sending the IMSI to the UDM/HSS S3. If the GUTI was allocated by a 4G network then the network node is an MME in an EPS. If the GUTI was allocated by a 5G network then the network node is an AMF.

Figure 4:
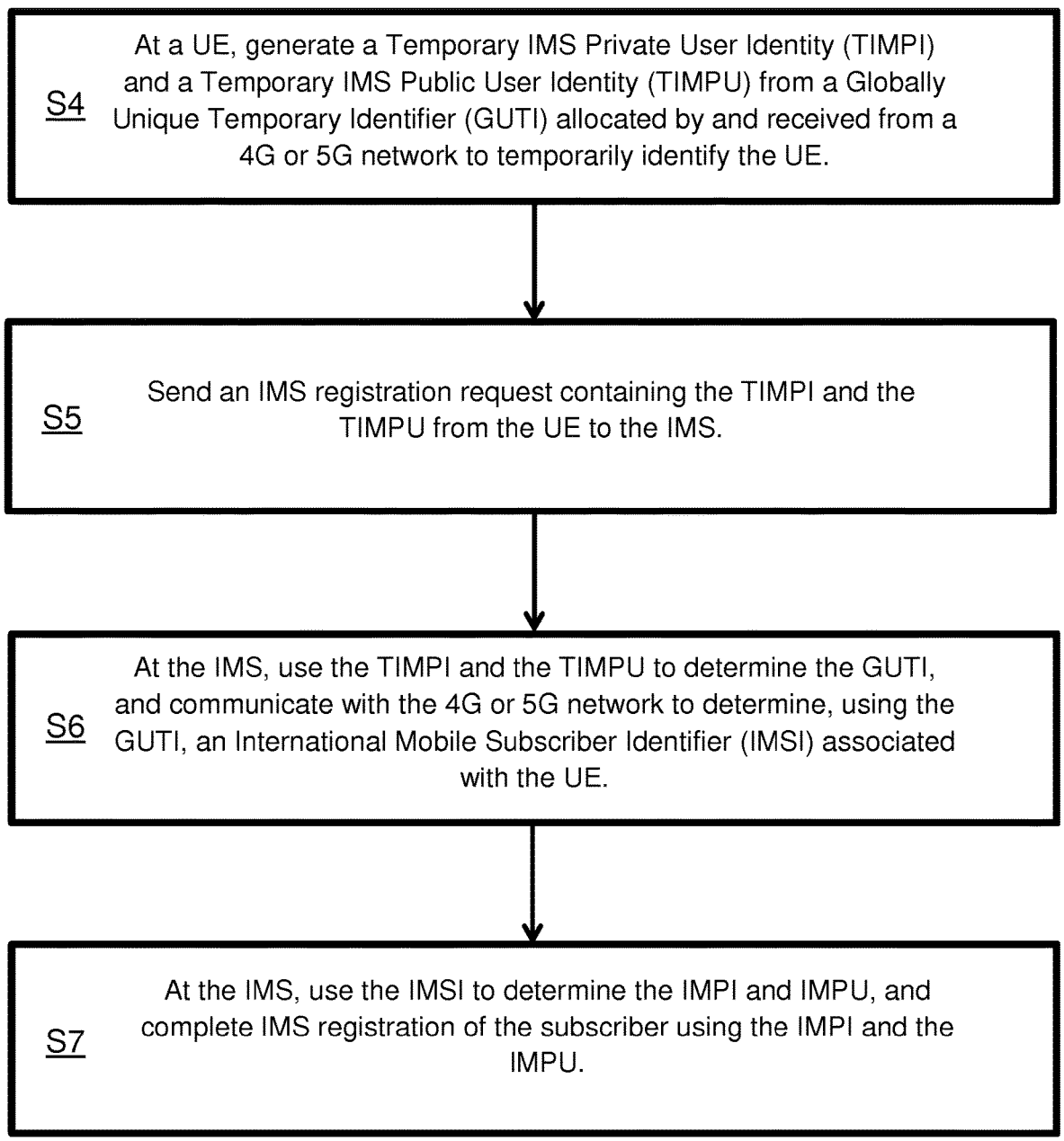
FIG. 4 is a flow chart illustrating the steps of a method according to an embodiment.

FIG. 4 is a flow chart illustrating the steps of a method of registering a subscriber in an IMS according to an embodiment of the invention. The method comprises At a UE, generating a Temporary IMS Private User Identity (TIMPI) and a Temporary IMS Public User Identity (TIMPU) from a Globally Unique Temporary Identifier (GUTI) allocated by and received from a 4G or 5G network to temporarily identify the UE S4; Sending an IMS registration request containing the TIMPI and the TIMPU from the UE to the IMS S5; At the IMS, using the TIMPI and the TIMPU to determine the GUTI, and communicating with the 4G or 5G network to determine, using the GUTI, an International Mobile Subscriber Identifier (IMSI) associated with the UE S6; and at the IMS, using the IMSI to determine the IMPI and IMPU, and completing the IMS registration of the subscriber using the IMPI and the IMPU S7.

Figure 5:
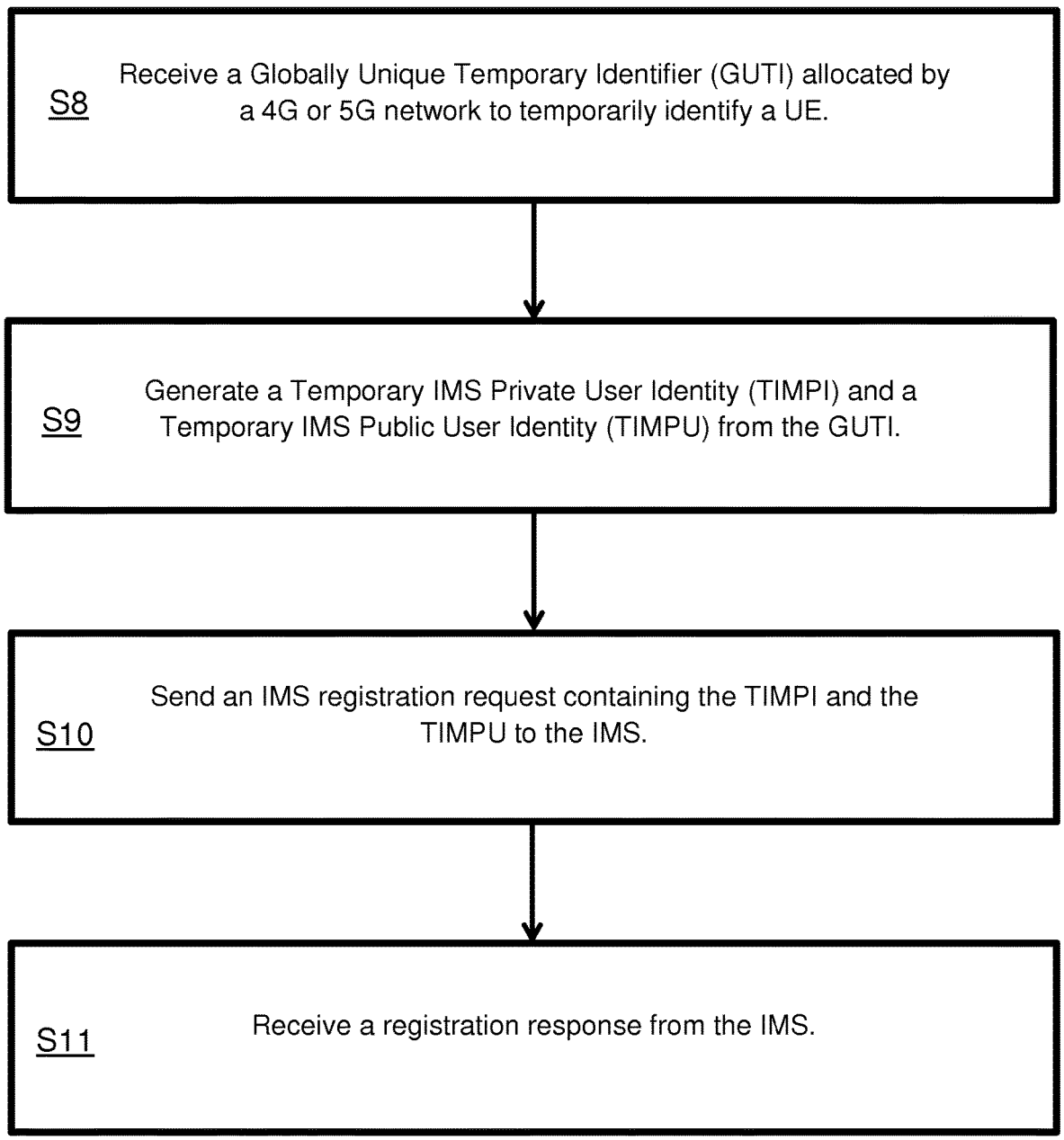
FIG. 5 is a flow chart illustrating the steps of a method of operating a User Equipment (UE) according to an embodiment.

FIG. 5 is a flow chart illustrating the steps of a method of operating a UE according to an embodiment of the invention. The method comprises receiving a Globally Unique Temporary Identifier (GUTI) allocated by a 4G or 5G network to temporarily identify a UE S8; Generating a Temporary IMS Private User Identity (TIMPI) and a Temporary IMS Public User Identity (TIMPU) from the GUTI S9; Sending an IMS registration request containing the TIMPI and the TIMPU to the IMS S10; and receiving a registration response from the IMS S11.

Figure 6:
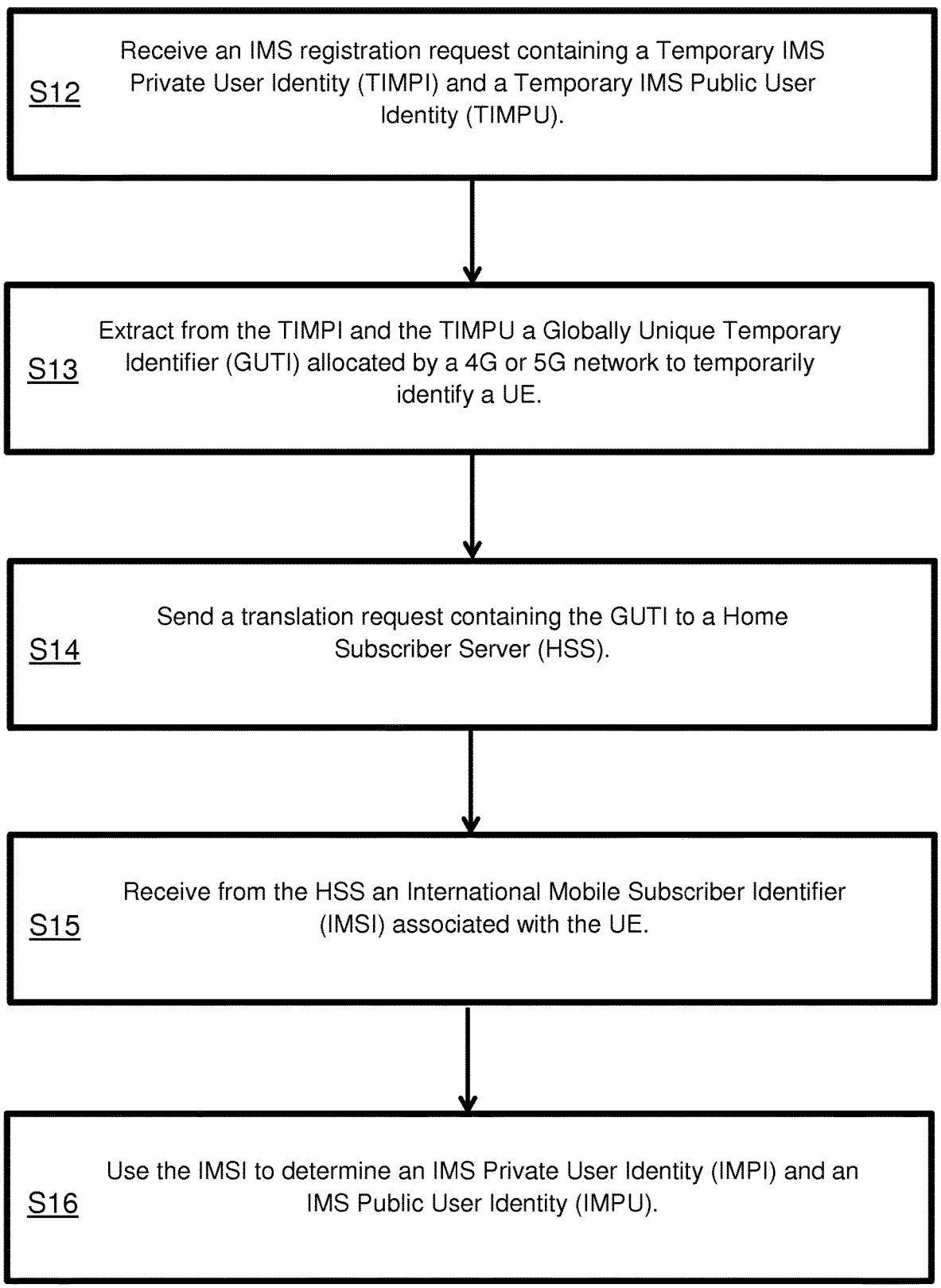
FIG. 6 is a flow chart illustrating the steps of a method of operating an Interrogating Call Session Control Function (I-CSCF) according to an embodiment.

FIG. 6 is a flow chart illustrating the steps of a method of operating an I-CSCF in an IMS according to an embodiment of the invention. The method comprises receiving an IMS registration request containing a Temporary IMS Private User Identity (TIMPI) and a Temporary IMS Public User Identity (TIMPU) S12; extracting from the TIMPI and the TIMPU a Globally Unique Temporary Identifier (GUTI) allocated by a 4G or 5G network to temporarily identify a UE S13; sending a translation request containing the GUTI to a HSS S14; receiving from the HSS an International Mobile Subscriber Identifier (IMSI) associated with the UE S15; and using the IMSI to determine an IMS Private User Identity (IMPI) and an IMS Public User Identity (IMPU) S16.

Figure 7:
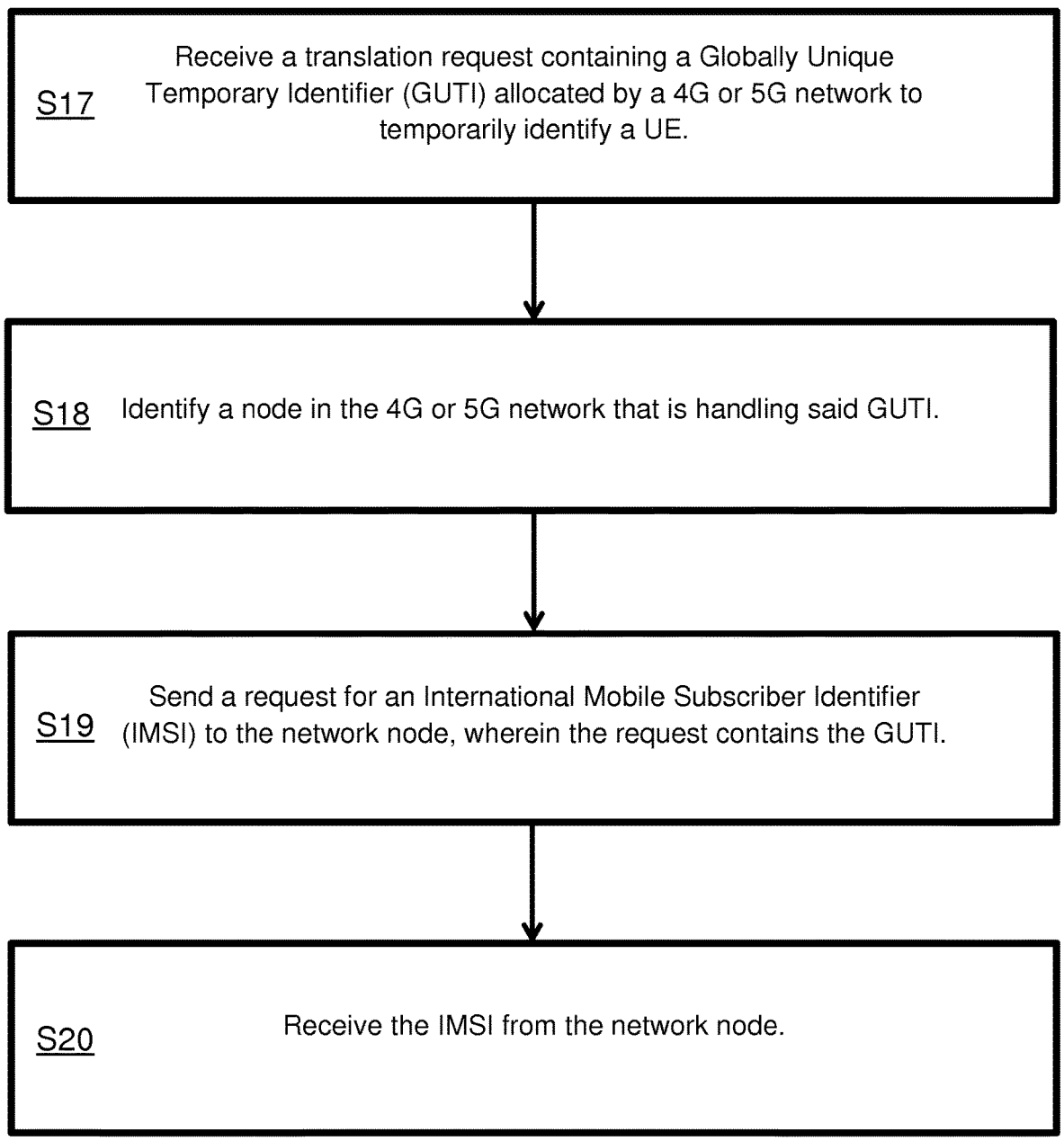
FIG. 7 is a flow chart illustrating the steps of a method of operating a Home Subscriber Server (HSS) according to an embodiment.

FIG. 7 is a flow chart illustrating the steps of a method of operating a HSS. The method comprises receiving a translation request containing a Globally Unique Temporary Identifier (GUTI) allocated by a 4G or 5G network to temporarily identify a UE S17; Identifying a node in the 4G or 5G network that is handling said GUTI S18; Sending a request for an International Mobile Subscriber Identifier (IMSI) to the network node, wherein the request contains the GUTI S19; and receiving the IMSI from the network node S20.

Figure 8:
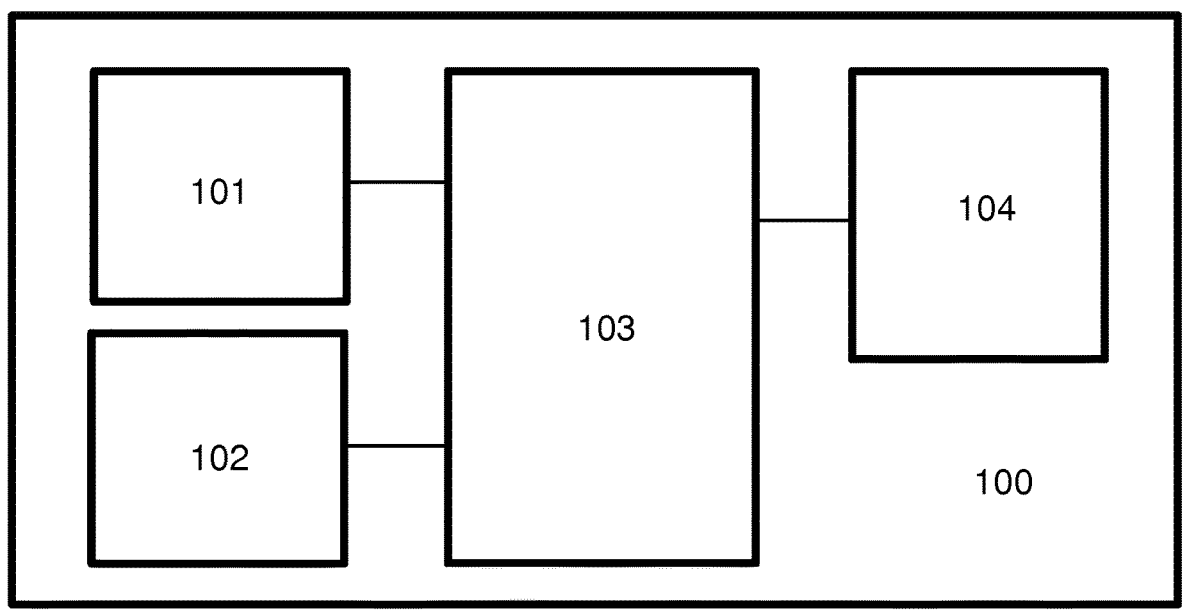
FIG. 8 is a schematic diagram of an apparatus according to an embodiment of the invention.

FIG. 8 shows a schematic diagram of an apparatus 100 for registering a subscriber in an IP Multimedia Subsystem (IMS). The apparatus 100 contains a receiver 101, a transmitter 102, a processor (or processors) 103, and a memory 104. The receiver 101 is configured to receive a GUTI from a network node. The processor 103 is configured to generate a TIMPI and a TIMPU from the GUTI. The processor 103 is operative to cause the transmitter 102 to send the TIMPI and TIMPU to the P-CSCF of an IMS in an IMS registration request. The TIMPI may be included in the IMPI parameter field in a SIP REGISTER message, and the TIMPU may be included in the IMPU parameter field in the SIP message. The receiver 101 is further configured to receive a registration response from the IMS.

Although the invention has been described by specific embodiments, the skilled person will realise that various modifications may be made without departing from the scope of invention.

The invention claimed is:

1. A method of registering a subscriber in an IP Multimedia Subsystem (IMS), said subscriber being associated with a 4G or 5G conforming User Equipment (UE), the method comprising:
    at the UE, generating a Temporary IMS Private User Identity (TIMPI) and a Temporary IMS Public User Identity (TIMPU) from a Globally Unique Temporary Identifier (GUTI) allocated by and received from a 4G or 5G network to temporarily identify the UE;
    sending an IMS registration request containing the TIMPI and the TIMPU from the UE to the IMS;
    at the IMS, using the TIMPI and the TIMPU to determine the GUTI, and communicating with the 4G or 5G network to determine, using the GUTI, an International Mobile Subscriber Identifier (IMSI) associated with the UE;
    at the IMS, using the IMSI to determine an IMS Private User Identity (IMPI) and an IMS Public User Identity (IMPU) associated with the subscriber; and
    completing IMS registration of the subscriber using the IMPI and the IMPU.

2. The method of claim 1, wherein:
    the IMS registration request is a Session Initiation Protocol (SIP) REGISTER message,
    the TIMPI is included in an IMS Private User Identity (IMPI) field in the SIP REGISTER message, and
    the TIMPU is included in an IMPU field in the SIP REGISTER message.

3. The method of claim 1, wherein communicating with the 4G or 5G network to determine the IMSI comprises:
    at an Interrogating Call State Control Function (I-CSCF) of the IMS, extracting the GUTI from the TIMPI and TIMPU;
    sending a translation request containing the GUTI from the I-CSCF to a Home Subscriber Server (HSS); and
    performing the following operations at the HSS:
        identifying a network node in the 4G or 5G network that is handling the GUTI;
        sending a translation request to the identified network node;
        receiving the IMSI from the identified network node in response to the translation request; and
        sending the received IMSI to the I-CSCF.

4. The method of claim 1, wherein one of the following applies:
    the GUTI is received from a node in an Evolved Packet System (EPS); or
    the GUTI is a 5G-GUTI that is received from a node in a 5G system and the GUTI is a 5G-GUTI.

5. A method of registering a subscriber in an IP Multimedia Subsystem (IMS) performed at a 4G or 5G conforming User Equipment (UE), the method comprising:
    receiving a Globally Unique Temporary Identifier (GUTI) allocated by a 4G or 5G network to temporarily identify the UE;
    generating, based on the GUTI, a Temporary IMS Private User Identity (TIMPI) and a Temporary IMS Public User Identity (TIMPU);
    sending, to the IMS, an IMS registration request containing the TIMPI and the TIMPU; and
    receiving a registration response from the IMS.

6. The method of claim 5, wherein:
    the IMS registration request is a Session Initiation Protocol (SIP) REGISTER message,
    the TIMPI is included in an IMS Private User Identity (IMPI) field in the SIP REGISTER message, and
    the TIMPU is included in an IMS Public User Identity (IMPU) field in the SIP REGISTER message.

7. The method of claim 5, wherein one of the following applies:
    the GUTI is received from a node in an Evolved Packet System (EPS); or
    the GUTI is a 5G-GUTI that is received from a node in a 5G system and the GUTI is a 5G-GUTI.

8. An apparatus configured to register a subscriber, associated with the apparatus, in an IP Multimedia Subsystem (IMS), the apparatus comprising:
    a receiver configured to communicate with the IMS and with a 4G or 5G network;
    a transmitter configured to communicate with the IMS; and
    a processor operably coupled to the receiver and the transmitter, whereby the processor, transmitter, and receiver are configured to perform operations corresponding to the method of claim 5.

9. The apparatus of claim 8, wherein:
    the IMS registration request is a Session Initiation Protocol (SIP) REGISTER message,
    the TIMPI is included in an IMS Private User Identity (IMPI) field in the SIP REGISTER message, and
    the TIMPU is included in an IMS Public User Identity (IMPU) field in the SIP REGISTER message.

10. The apparatus of claim 8, wherein the receiver is configured to receive the GUTI from one of the following:
- a node in a 4G Evolved Packet System (EPS); or
- a node in a 5G system, wherein the GUTI is a 5G-GUTI.

11. The apparatus of claim 8, wherein the apparatus contains a Subscriber Identity Module (SIM) card.

12. A method of operating an Interrogating Call Session Control Function (I-CSCF) of an IP Multimedia Subsystem (IMS) during registration of a subscriber in the IMS, said subscriber being associated with a 4G or 5G conforming User Equipment (UE), the method comprising:
- receiving an IMS registration request containing a Temporary IMS Private User Identity (TIMPI) and a Temporary IMS Public User Identity (TIMPU);
- extracting from the TIMPI and the TIMPU a Globally Unique Temporary Identifier (GUTI) allocated by a 4G or 5G network to temporarily identify the UE;
- sending a translation request containing the GUTI to a Home Subscriber Server (HSS);
- receiving, from the HSS, an International Mobile Subscriber Identifier (IMSI) associated with the UE; and
- using the IMSI to determine an IMS Private User Identity (IMPI) and an IMS Public User Identity (IMPU) associated with the subscriber.

13. The method of claim 12, wherein:
- the IMS registration request is a Session Initiation Protocol (SIP) REGISTER message,
- the TIMPI is included in an IMPI field in the SIP REGISTER message, and
- the TIMPU is included in an IMPU field in the SIP REGISTER message.

14. A method of operating a Home Subscriber Server (HSS), during registration of a subscriber in an IP Multimedia Subsystem (IMS), to determine an International Mobile Subscriber Identity (IMSI) associated with a 4G or 5G conforming User Equipment (UE) that is associated with the subscriber, the method comprising:
- receiving a translation request containing a Globally Unique Temporary Identifier (GUTI) allocated by a 4G or 5G network to temporarily identify the UE;
- identifying a node in the 4G or 5G network that is handling said GUTI;
- sending a request for the IMSI to the network node, wherein the request contains the GUTI; and
- receiving the IMSI from the network node.

15. The method of claim 14, wherein one of the following applies:
- the network node is a Mobility Management Entity (MME) in an Evolved Packet System (EPS); or
- the network node is an Access and Mobility Function (AMF) in a 5G system and the GUTI is a 5G-GUTI.

16. The method of claim 14, further comprising sending the IMSI to an Interrogating Call State Control Function (I-CSCF) of the IMS.

17. A method of operating a network node, during registration of a subscriber in an IP Multimedia Subsystem (IMS), to provide an International Mobile Subscriber Identity (IMSI) associated with a 4G or 5G conforming User Equipment (UE) that is associated with the subscriber, the method comprising:
- receiving a request for the IMSI from a Home Subscriber Server (HSS), wherein the request contains a Globally Unique Temporary Identifier (GUTI) allocated by a 4G or 5G network to temporarily identify the UE;
- identifying the IMSI associated with the GUTI; and
- sending the IMSI to the HSS.

18. The method of claim 17, wherein one of the following applies:
- the network node is a Mobility Management Entity (MME) in an Evolved Packet System (EPS); or
- the network node is an Access and Mobility Function (AMF) in a 5G system and the GUTI is a 5G-GUTI.

\* \* \* \* \*